United States Patent [19]

Koerner

[11] Patent Number: 4,808,238

[45] Date of Patent: Feb. 28, 1989

[54] SELECTIVE COATING OF AND COATING REMOVAL FROM METAL PARTS PARTICULARLY CONSTRUCTION PARTS FOR AIRCRAFT

[75] Inventor: Volkmar Koerner, Nordenham, Fed. Rep. of Germany

[73] Assignee: MBB GmbH, Bremen, Fed. Rep. of Germany

[21] Appl. No.: 39,615

[22] Filed: Apr. 16, 1987

[30] Foreign Application Priority Data

Apr. 19, 1986 [DE] Fed. Rep. of Germany ....... 3613274

[51] Int. Cl.[4] ............................................... B08B 7/04
[52] U.S. Cl. ...................................................... 134/38
[58] Field of Search ........................................... 134/38

[56] References Cited

U.S. PATENT DOCUMENTS

| | | | |
|---|---|---|---|
| 3,379,645 | 4/1968 | Kendall | 134/38 |
| 3,536,629 | 10/1970 | Kendall | 134/38 |
| 4,325,779 | 4/1982 | Rossetti | 134/38 |

Primary Examiner—Asok Pal
Attorney, Agent, or Firm—Ralf H. Siegemund

[57] ABSTRACT

Aside from certain immediate preparatory steps, the parts are primer coaated and cured on surface parts from which that coating may have to be removed but for which that coating serves as protection; other surface parts are primer coated and the coating is just dried. Following some preliminary assembly of parts the latter surface parts are then painted or lacquered. After completion of assembly the cured coating is chemically removed by a thickened, 20:1 blend of sulfuric acid ($H_2SO_4$) and nitric acid ($HNO_3$).

5 Claims, 1 Drawing Sheet

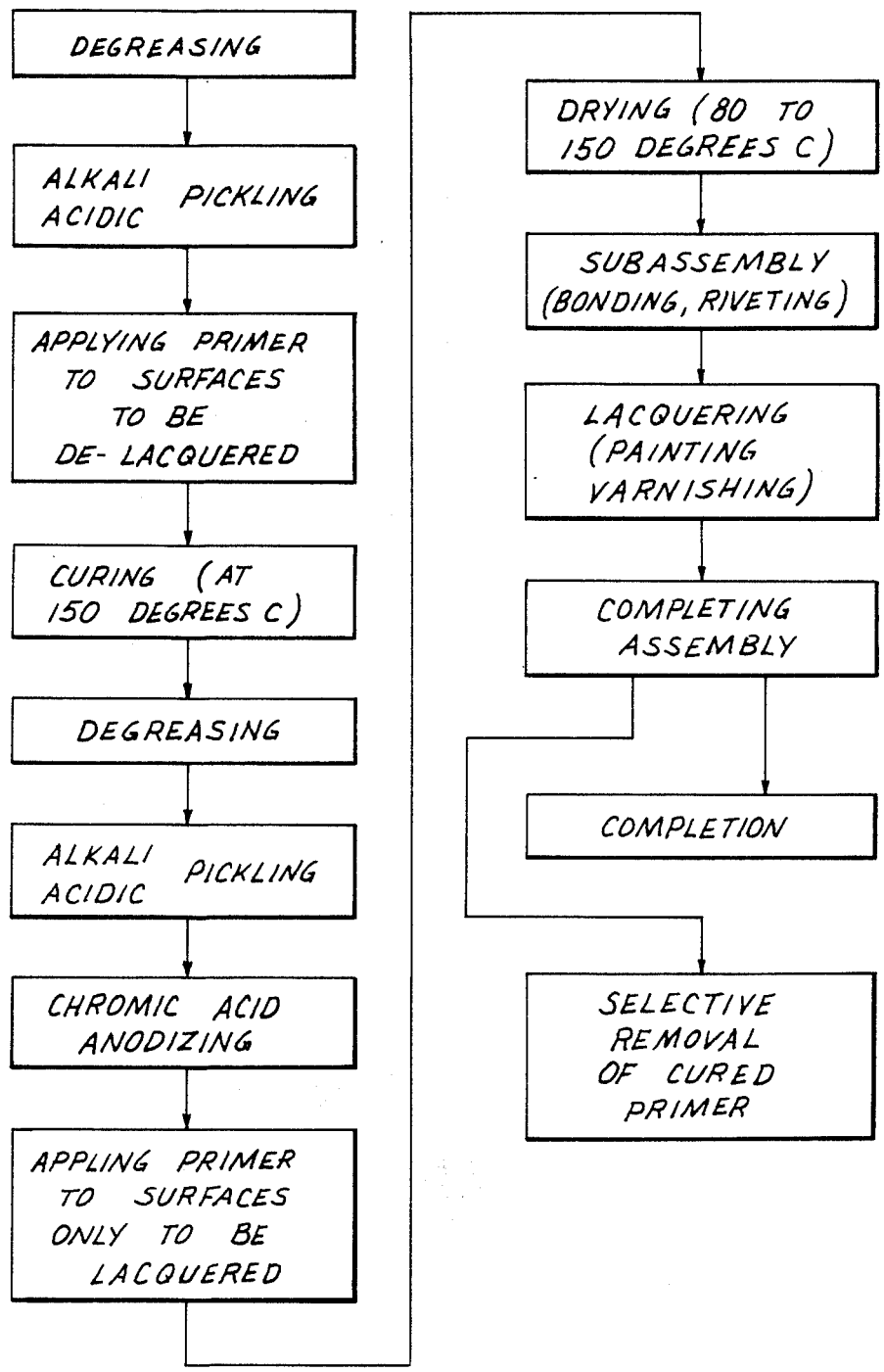

SELECTIVE COATING OF AND COATING REMOVAL FROM METAL PARTS PARTICULARLY CONSTRUCTION PARTS FOR AIRCRAFT

BACKGROUND OF THE INVENTION

The present invention relates to the selective application and removal of particular coatings from metal parts, particularly metallic parts used as structural components in aircraft, space vehicles, or the like.

Occasionally, it is necessary to remove a lacquer coating, a paint coating or a varnish coating from the outer skin of an aircraft. The purpose thereof is to inspect the integrity of the metallic substrate underneath, or simply for purposes of re-varnishing or re-painting the part. The known methods for removal of varnish paint and lacquer are very expensive. Moreover, it was found that the removal unduly loads the ecology because the removing liquids are relatively poisonous and, in cases, evaporate rather rapidly. See, as to this aspect, the German printed patent application No. 25 19 559.

Some aircraft manufacturer and operators (airlines) have, therefor, opined that they should use their aircraft essentially without any unique, for exampel, airline-specific coating. This is an intriguing aspect, because it leads to considerable savings in weight which, of course, is beneficial on the positive side, as far as payloads are concerned. However, the avoidance of varnishing, painting or lacquer coating an aircraft is little more than wishful thinking, because it can, in fact, be realized only with considerable expenditure. The reason for this is that these metal parts have been anodized by chromic acid, and prior to being assembled, for example, through some bondung and adhesive technique, they are always provided with a primer. This primer will then serve as a base coating for any possible subsequent varnishing, painting or lacquering. However, the aircraft operator may acquire an aircraft which he does not want to have provided with a lacquer, paint or varnish coating, or the aircraft operator may want only some parts to be so coated. Therefore, in such a case, the outer skin has to be subjected to a primer removal process which, of course, takes place after the aircraft has been assembled. The removal of the primer can be obtained, for example, through blasting, grinding, followed by subsequent polishing, but it is immediately apparant that these kinds of removal process may locally produce damage in the metal structure. This damage may be unexpected and, in fact, appear, in some form, as a hidden defect. Independently from the safety factor involved here, this removal process is labor extensive, and, therefore, expensive.

DESCRIPTION OF THE INVENTION

It is an object of the present invention to provide a new and improved method, as well as equipment and material for removal of varnish, paint and/or lacquer from metallic parts, particularly from parts to be used in an aircraft, permitting the metal parts to be provided with a protective layer or coating which protects the surface against mechanical and/or chemical damage. Moreover, these coatings should be easily removable, should be basically inexpensivein the application but the removal of the layer should be inexpensive also, and unduely load the ecology; on the other hand the method should not be a barrier against subsequent primer or lacquer coating by the customer and should still permit easy removal.

In accordance with the preferred embodiment of the present invention the object is attained by proceeding in the following manner:

A metal part, component or the like is first subject to a degreasing process, followed by alkali pickling, which in turn is followed by pickling in acid, and application of a primer as a base coating whenever needed. That primer is cured at about 150 degree centigrade, and again the surface is degreased, sequentially pickled in alkali and acid, chrome acid anodized, at least as to said side or surface, subsequently to be lacquered or painted, if any, following which another primer and base coating is applied where previously it was not applied, and then the part is dried at temperatures between 80 and 100 degrees centigrade and 150 degrees centigrade. A part so treated is then structurally combined with another similarly treated part or parts through bonding or riveting, or the like, and all these parts are subsequently varnished, painted or lacquered on that one side with thedried on base coating whereupon the thus pre-treated, metal parts are interconnected and other wise assembled to obtain for example the outer skin of the craft.

The removal of the lacquer from the skin is carried out by a medium which is comprised of 20 parts by weight of sulfuric acid $H_2SO_4$ and 1 part of nitric acid $HNO_3$, thickened by a filler and thixotropic medium. The base lacquer provided on that part of the surface of parts from which it later may have to be removed serves as an easily removable protective layer, the protection is provided as against mechanical and chemical damages. The base lacquer prevents chromium acid anodizing. The filling and sycsotropic material limits chemical agression. A thickening may occur even down to a almost, or nearly, pasty consistency. The lacquer removing medium may be applied at a pasty state. The cured base coating can be removed by applying the pastry remover directly or by applying it to a sheet or the like and applying that sheet to the coating for a few minutes. The sheet is then removed followed by easy removal of the coating.

DESCRIPTION OF THE DRAWINGS

While the specification concludes with claims particularly pointing out and distinctly claiming the subject matter which is regarded as the invention, it is believed that the invention, the objects and features of this invention and further objects, features and advantages thereof will be better understood from the following description taken in connection with the accompanying drawings in which:

The FIGURE is a flow chart described in details below.

It can, thus, be seen that the invention, as it is applied to pre-manufactured metal parts, such as parts cut to serve as outer skin sheets, are, at first, degreased in a manner known per se. Subsequently, the part is first pickled in alkali followed by pickling in an acid. These parts will then be treated by base coating being a primer and being applied, for example, through spraying. The base coat or primer is known, for example, under the trade name "BSL 101" and offered by Ciba-Geigy. This particular coating is particularly applied to those surfaces of the construction part which later will become outside surfaces and fromwhich the coating may have to be removed. Curing occurs in a primer furnace at temperature of about 150° centigrade, which primer and base coating protects the metal parts underneath against undesired mechanical and chemical damage. This then completes the preparation, following which a mechanical working occurs by making the blank sheets into the specific skin parts for an aircraft. This requires again degreasing, alkali and acidic pickling, chromium acid anodizing, so as to obtain the desired inside surface for the sheets to be used as outer skin sheet for the aircraft, while the outside, being protected through the primer and base coating "BSL 101" remains as is. Subsequently, the primer "BSL 101" is also applied to the inside of the sheet, and dried in a primer furnace at a temperature between 80° and 150° centigrade.

The, thus, treated sheets for an aircraft skin can now be interconnected through suitable bonding or riveting, in a manner known per se. One may, if it is so desired, not lacquer or paint the inside of the sheet carrying the dried (not cured) base coating and then the particular aircraft cell, to which the sheet or sheets pertain, can be assembled. A completed aircraft, if a pure metal surface is desired, may now require merely removal of the primer covering the outer skin. The removal may involve the outer skin in its entirety, or any desired parts thereof.

For de-lacquering, it is suggested to use a blend or mixture of 20 parts sulfuric acid $H_2SO_4$ and 1 part nitric acid $HNO_3$. This kind of lacquer removal is known, but in the past was used only in a laboratory under utilization of exhaust hoods for paper removal during removing the lacquer from relatively small metal parts. The reason for this limitation in the past is that this particular remedial medium is highly agressive, and reacts explosively with water. In order to facilitate handling this liquid in a rougher environment, it is preferably thickened by means of the known filler and thixotropic materia. traded under the name "Aerosil" by the Degussa Company. Adding the thickening medium is carried out until the desired degree of pastiness is obtained. Tests have shown that the mixture of acids, constituting the basic lacquer removal medium, can be thickened until it is indeed pasty or cream-like. This thickening renders the acid blend less agressive. This, in turn, means that the particular medium can now be applied, for example, to woven webs or sheets, which in turn, are placed on top of the metal surfaces, from which the lacquer has to be removed. But the pasty material can also be applied directly to these metal surfaces. After a few minutes reaction time, the primer together with any lacquer, can be removed from the metal surface.

It was found that the inventive primer removal method provides for a very advantageous protection of the surface of metal parts as against mechanical and chemical agression and damage. Damaging materials are here, for example, hydraulic oil in the aircraft which may appear during any kind of assembly work of an aircraft. The primer, as proposed here, protects well the surface of the sheets, particularly where overlapping, as well as in dimpel and riveting areas. The primer can readily be removed from the outer skin, and on the inside it is a good base to which lacquers and paint will readily adhere. This way, one can manufacture aircrafts which offer a pure metallic surface without inviting the danger of mechanical and chemical damages, during further manufacture or during primer removal from the metallic parts. Another advantage is that the aircraft now are provided with a lacquer (primer) coating on the outer skin which can easily be re-stripped subsequently in a manner that does not load the ecology.

The invention is not limited to the embodiments described above, but all changes and modifications thereof, not constituting departures from the spirit and scope of the invention are intended to be included.

I claim:

1. Method of treating metal parts to be assembled for aircraft, comprising the steps of:
   (i) pre-treating these parts by degreasing, alkali pickling, acid pickling, application of a protective primer to surface parts which will later be outside surface parts and from which the primer coating is to be removed, curing the primer at about 150° centigrade;
   (ii) again degreasing alkali pickling, acid pickling, and chromic acid anodizing the parts on that side which later will be inside surface and is to receive a paint coating or a lacquer coating, applying thereto a primer and drying the primer as applied at a temperature between 80° and 150° centigrade;
   (iii) interconnecting parts pretreated as per (i) and (ii) and applying a lacquer or paint to the surface portions carrying the dried on primer, and completing the assembly to obtain an outer skin; and
   (iv) removing the cured primer from those outside surface portions of the interconnected parts where removal is wanted, by means of a medium being comprised of 20 parts sulfuric acid, 1 part nitric acid, and a filling and thixotropic medium.

2. Method as in claim 1, any thickening providing the filling and thixotropic medium to obtain a pasty or cream-like consistency.

3. Method as in claim 1, the cured coating where applied as per (i) preventing chromic acid anodizing.

4. Method as in claim 1, the removal medium being directly applied to the metal coating.

5. Method as in claim 1, the removal medium being indirectly applied by being applied to a web or sheet which then is laid onto the coating to be removed.

* * * * *